(12) United States Patent
O'Brien et al.

(10) Patent No.: US 6,456,289 B1
(45) Date of Patent: Sep. 24, 2002

(54) ANIMATION SYSTEM AND METHOD FOR ANIMATING OBJECT FRACTURE

(75) Inventors: James F. O'Brien, Smyrna; Jessica K. Hodgins, Atlanta, both of GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/369,608

(22) Filed: Aug. 6, 1999

Related U.S. Application Data

(60) Provisional application No. 60/130,796, filed on Apr. 23, 1999.

(51) Int. Cl.⁷ .............................................. G06T 17/00

(52) U.S. Cl. ...................................... 345/473; 345/474

(58) Field of Search ................................ 345/473, 474, 345/475, 418

(56) References Cited

U.S. PATENT DOCUMENTS

| | | | | |
|---|---|---|---|---|
| 5,261,041 A | * | 11/1993 | Susman | 345/419 |
| 6,067,096 A | * | 5/2000 | Nagle | 345/473 |
| 6,191,798 B1 | * | 2/2001 | Handelman et al. | 345/473 |

* cited by examiner

*Primary Examiner*—Cliff N. Vo
(74) *Attorney, Agent, or Firm*—Thomas, Kayden, Horstemeyer & Risley, LLP

(57) ABSTRACT

Animation systems and methods are provided for modeling and animating objects, including breaking, tearing or cracking of the objects. In a preferred embodiment, the present invention includes setting initial conditions for an object, with the initial conditions including a first parameter defining a fracture condition. Preferably, the object is defined by at least one node. A second parameter corresponding to forces present at the node is determined. When the second parameter equals or exceeds the first parameter, a fracture is generated within the object with the fracture originating at the node.

18 Claims, 15 Drawing Sheets

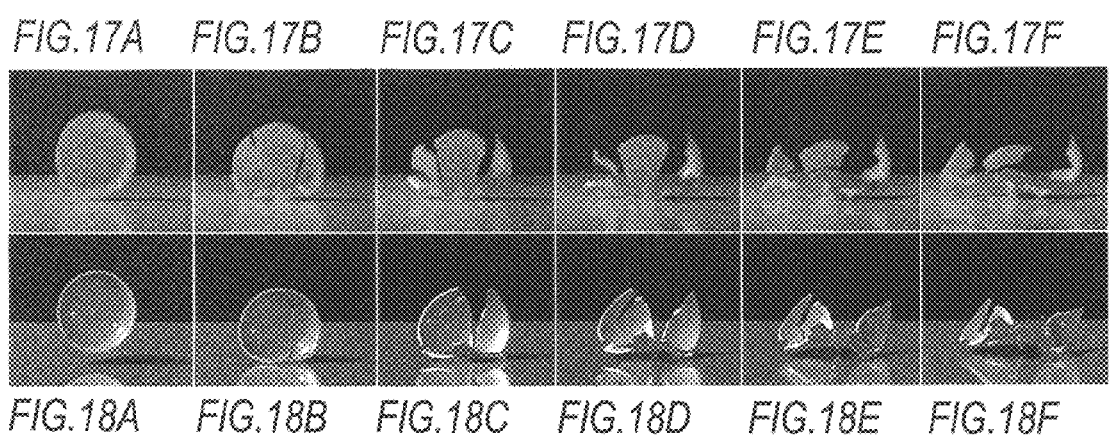

ANIMATION SYSTEM AND METHOD FOR A ANIMATING OBJECT FRACTURE

CROSS-REFERENCE TO RELATED APPLICATIONS

This application is based on and claims priority to U.S. Provisional Application, Serial No. 60/130,796, filed on Apr. 23, 1999.

BACKGROUND OF THE INVENTION

1. Field of the Invention

The present invention generally relates to computer graphics. More specifically, the present invention relates to animation systems and methods for providing realistic modeling and animation of objects, including breaking, tearing or cracking of the objects.

2. Description of the Related Art

In commercial animation, there presently exists a high degree of enthusiasm surrounding the development of efficient and effective techniques for producing simulations of passive objects, e.g., objects without an internal source of energy. The appeal of using simulations for these objects is not surprising, as passive objects tend to have many degrees of freedom, making keyframing or motion capture difficult. Furthermore, while passive objects often are essential to the plot of an animation and affect the appearance or mood of the animation, passive objects are not characters with their concomitant requirements for control over the subtle details of the motion. Therefore, simulations in which the motion is controlled only by initial conditions, physical equations, and material parameters often are sufficient to produce appealing simulations of passive objects.

In order that adequate visual representations of the actions and interactions of passive objects are created, simulations of such objects should provide for realistic trajectories, collisions, material deformations and fractures. Heretofore, several techniques have been developed for animating dynamic, deformation-induced fracture. For example, in 1988, Terzopoulos and Fleischer, presented a general technique for modeling viscoelastic and plastic deformations. (See, D. Terzopoulos and K. Fleischer. Deformable models. *The Visual Computer*, 4:306–331, 1988, and; D. Terzopoulos and K. Fleischer. Modeling inelastic deformation: Viscoelasticity, plasticity, fracture. *In Computer Graphics* (SIGGRAPH '88 Proceedings), volume 22, pages 269–278, August 1988).

Their method used three fundamental metric tensors to define energy functions that measured deformation over curves, surfaces, and volumes. These energy functions provided the basis for a continuous deformation model that they simulated using a variety of discretization methods. One of their methods made use of a finite differencing technique defined by controlled continuity splines. (See, D. Terzopoulos. Regularization of inverse visual problems involving discontinuities. *IEEE Transactions on Pattern Analysis and Machine Intelligence*, 8(4):413–424, July 1986). In accordance with this technique, certain fracture effects could be modeled by setting the elastic coefficients between adjacent nodes of a modeled object to zero whenever the distance between the nodes exceeded a threshold. They demonstrated this technique with sheets paper and cloth that could be torn apart.

In 1991, Norton and his colleagues presented a technique for animating 3D solid objects that broke when subjected to large strains (See, A. Norton, G. Turk, B. Bacon, J. Gerth, and P. Sweeney. Animation of fracture by physical modeling. *The Visual Computer*, 7:210–217, 1991). Their technique used a spring and mass system to model the behavior of an object. When the distance between two attached mass points exceeded a threshold, the simulation severed the spring connection between them. To avoid having flexible strings of partially connected material hanging from the object, their simulation broke an entire cube of springs at once. They demonstrated this technique with a simulated teapot that shattered when dropped onto a table.

Two limitations are inherent in both of these methods. First, when the material of the simulated object fails, the exact locations and orientations of the fractures are not known. Rather, the failure is defined as the entire connection between the two mass points or nodes, and the orientation of the fracture plane is left undefined. As a result, these techniques can only realistically model effects that occur on a scale much larger than the inter-node spacing. The second limitation is that fracture surfaces are restricted to the boundaries in the initial mesh structure. As a result, the fracture pattern exhibits directional artifacts, similar to the "jaggies" that occur when rasterizing a polygonal edge. These artifacts are particularly noticeable when the discretization follows a regular pattern. If an irregular mesh is used, then the artifacts may be partially masked, but the fractures will still be forced onto a path that follows the element boundaries so that the object can break apart only along predefined facets.

Other relevant work in computer graphics includes techniques for modeling static crack patterns and fractures induced by explosions. For instance, Hirota and colleagues described how phenomena such as the static crack patterns created by drying mud can be modeled using a mass and spring system attached to an immobile substrate. (See, K. Hirota, Y. Tanoue, and T. Kaneko. Generation of crack patterns with a physical model. *The Visual Computer*, 14:126–137, 1998). Additionally, Mazarak et. al. use a voxel-based approach to model solid objects that break apart when they encounter a spherical blast wave. (See, 0. Mazarak, C. Martins, and J. Amanatides. Animating exploding objects. In *Graphics Interface '99*, June 1999). Also, Neff and Fiume use a recursive pattern generator to divide a planar region into polygonal shards that fly apart when acted on by a spherical blast wave. (See, M. Neff and E. Fiume. A visual model for blast waves and fracture. In *Graphics Interface '99*, June 1999). However, these techniques also suffer from limitations in that they employ ad hoc criteria, which typically are unrelated to material deformation, for generating fracture.

Therefore, there is a need in the field of computer animation for improved animation systems and methods which address these and other shortcomings of the prior art.

BRIEF SUMMARY OF THE INVENTION

Briefly described, the present invention provides animation systems and methods for animating object fracture. In a preferred embodiment, the present invention comprises setting initial conditions for an object, with the initial conditions including a first parameter defining a fracture condition. The object is defined by at least one node, and a second parameter corresponding to forces at the node is determined. When the second parameter equals or exceeds the first parameter, a fracture is generated within the object, with the fracture originating at the node.

In accordance with an aspect of the present invention, the fracture preferably is generated within the object by replicating the fracture origination node into a first node and a second node. A plane of fracture corresponding to the node is then computed, with the plane defining first and second sectors. A first portion of the object is then assigned to the first sector, which includes the first node, and a second portion of the object as assigned to the second sector, which includes the second node.

In accordance with another aspect of the present invention, a preferred method of animating object fracture in an object, which is defined by at least one element having a boundary, includes the steps of: (1) determining that fracture of an object should be initiated, and; (2) generating a fracture within the object, with the fracture being capable of propagating through the object independent of the boundary of the object's defining element.

In accordance with another aspect of the present invention, a preferred embodiment of the present invention comprises a computer readable medium incorporating a computer program for animating object fracture. Preferably, the computer readable medium includes a first code segment which determines a parameter corresponding to forces at a node of an object, and a second code segment which generates a fracture within the object when the parameter at least equals an additional parameter defining a fracture condition of the object. Preferably, the generated fracture originates at the node.

In accordance with another aspect of the present invention, a preferred embodiment of the animation system of the present invention comprises means for determining a parameter corresponding to forces at a node of an object, and means for generating a fracture within the object when the parameter at least equals an additional parameter defining a fracture condition of the object. Additionally, the animation system may incorporate means for modeling the object so that the object is defined by at least one node, as well as means for rendering the object so as to produce graphic images of the object before, during and after fracture.

Other features and advantages of the present invention will become apparent to one of reasonable skill in the art upon examination of the following drawings and detailed description. It is intended that all such additional objects, features, and advantages be included herein within the scope of the present invention, as defined by the claims.

BRIEF DESCRIPTION OF THE SEVERAL VIEWS OF THE DRAWINGS

The present invention will be more fully understood from the accompanying drawings of various embodiments of the invention which, however, should not be taken to limit the invention to the specific embodiments enumerated, but are for explanation and for better understanding only. Furthermore, the drawings are not necessarily to scale, emphasis instead being placed upon clearly illustrating the principles of the invention. In the drawings:

FIG. 8A depicts the object of FIGS. 8A and 8B showing out of plane sheer loading mode.

FIGS. 17A–17F depict sequential high speed video images of a ceramic bowl dropped from approximately one meter onto a hard surface.

FIGS. 18A–18F depict a series of simulation images of a simulated bowl dropped onto a hard surface.

DETAILED DESCRIPTION OF THE PREFERRED EMBODIMENTS

Figure 1:
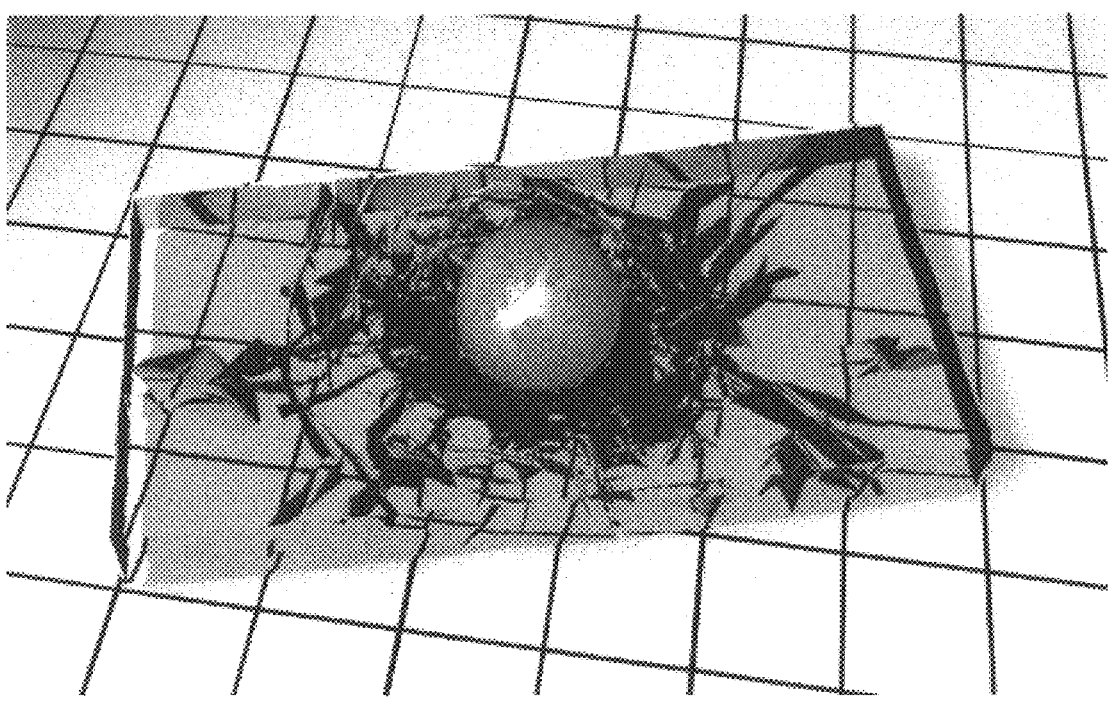
FIG. 1 is a single frame of a computer rendered animation scene depicting interaction of passive objects produced in accordance with a preferred embodiment of the present invention.

Reference will now be made in detail to the description of the invention as illustrated in the drawings, wherein like reference numbers indicate like parts throughout the several views. As shown in FIG. 1, the animation system of the present invention is capable of providing realistic computer generated images depicting the action and interaction of objects (i.e., the representative glass slab and ball), including the initiation and propagation of cracks or fractures throughout the various objects. This is accomplished by analyzing stresses computed over a model of the objects, and determining where cracks should initiate as well as in what directions the cracks should propagate. Preferably, the crack initiation and propagation is determined by utilizing stress tensors which are evaluated over a finite element model, although various other techniques may be utilized. By varying the shapes and the material properties of the objects, and the initial conditions of the simulations, strikingly different effects can be achieved, such as simulating a wall that shatters when it is hit by a wrecking ball, and simulating a bowl that breaks in two when it is dropped on edge, among others.

The animation system of the present invention can be implemented in hardware, software, firmware, or a combination thereof. In a preferred embodiment, however, the invention is implemented as a software package, which can be adaptable to run on different platforms and operating systems as shall be described further herein.

A preferred embodiment of the animation system, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer readable medium can be, for example, but not limited to, an electronic, magnetic, optical, electromagnetic, infrared, or semi-conductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 2:
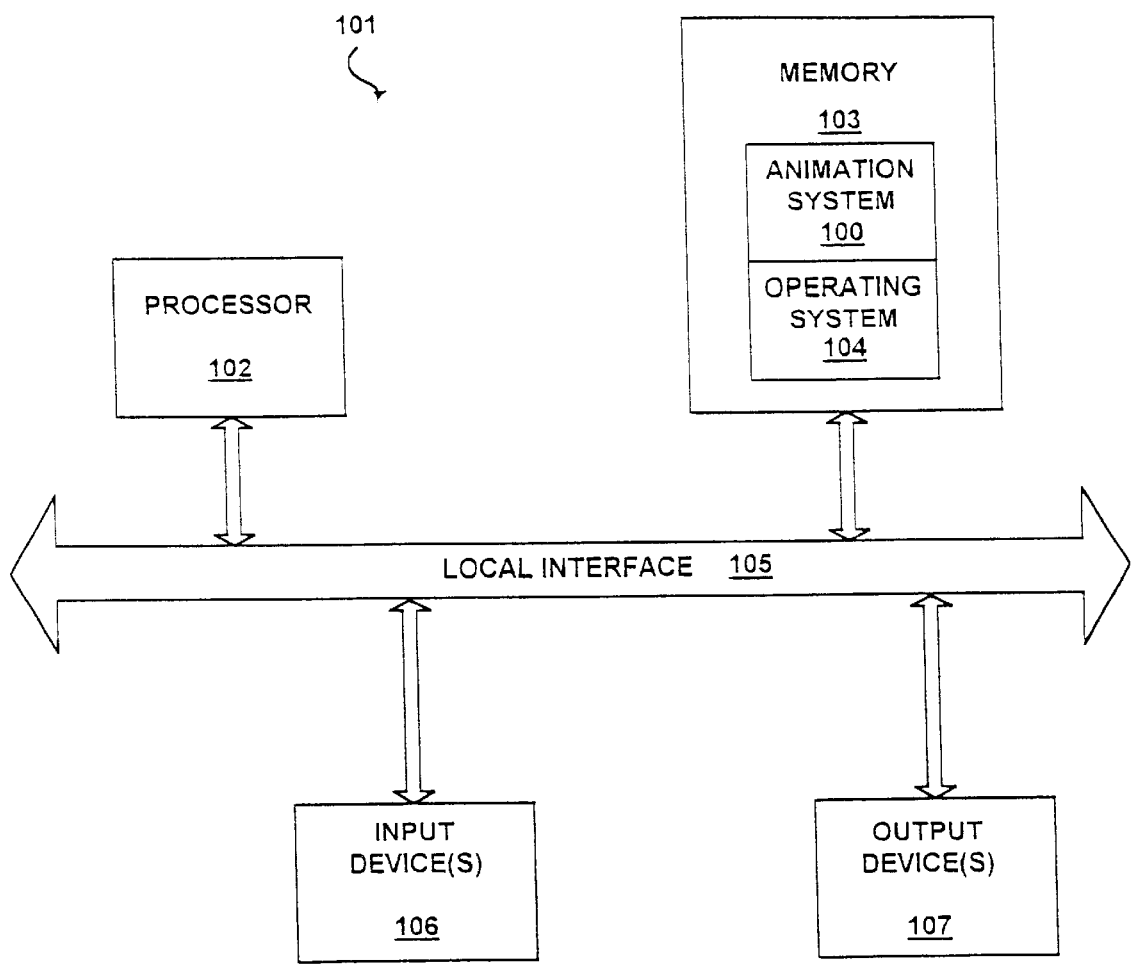
FIG. 2 is a block diagram illustrating a preferred embodiment of the present invention.

FIG. 2 illustrates a typical computer or processor-based system 101 which may utilize the animation system of the invention. As shown in FIG. 2, a computer system 101 generally comprises a processor 102 and a memory 103 with an operating system 104. Herein, the memory 103 may be any combination of volatile and nonvolatile memory elements, such as random access memory or read only memory. The processor 102 accepts instructions and data from memory 103 over a local interface 105, such as a bus(es). The system also includes an input device(s) 106 and an output device(s) 107. Examples of input devices may include, but are not limited to a serial port, a scanner, or a local access network connection. Examples of output devices may include, but are not limited to, a video display, a Universal Serial Bus, or a printer port. Generally, this system may run any of a number of different platforms and operating systems, including, but not limited to, Windows NT™, Unix™, or Sun Solaris™ operating systems. The animation system 100 of the present invention, the functions of which shall be described hereinafter, resides in memory 103 and is executed by the processor 102.

Figure 3:
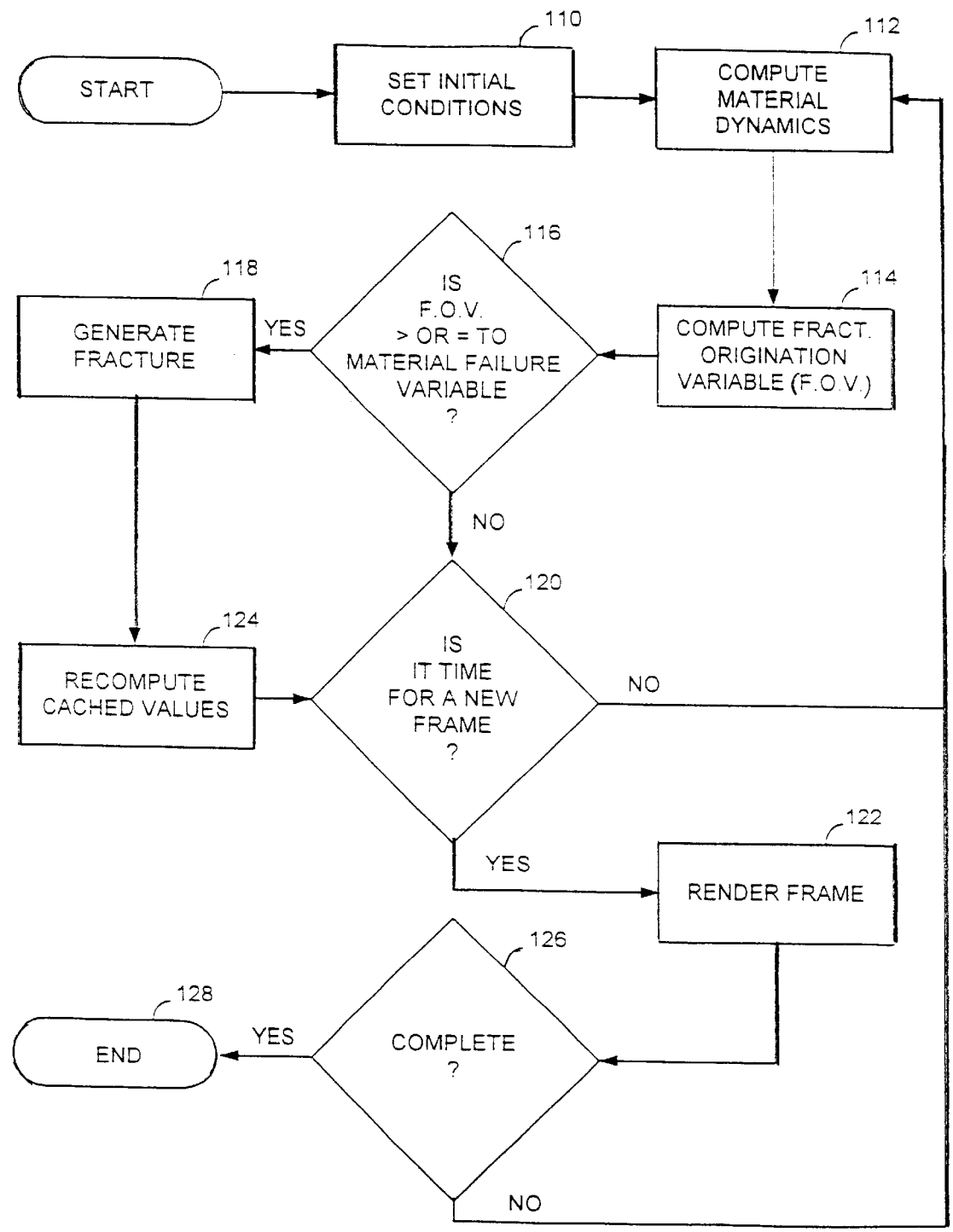
FIG. 3 is a flow diagram functionally demonstrating the steps performed by a preferred embodiment of the present invention during fracture origination and propagation.

The flow chart of FIG. 3 shows the architecture, functionality and operation of a preferred implementation of the animation system 100 depicted in FIG. 2. In this regard, each block of the flow chart represents a module segment or portion of code which comprises one or more executable instructions for implementing the specified logical function or functions. It should also be noted that in some alternative implementations the functions noted in the various blocks may occur out of the order depicted in FIG. 3. For example, two blocks shown in succession in FIG. 3 may in fact be executed substantially concurrently where the blocks may sometimes be executed in the reverse order depending upon the functionality involved. In the embodiment of the animation system 100 depicted in FIG. 3, initial conditions are first defined by a user as depicted in block 110. These initial conditions include but are not limited to discretization of the objects, defining material parameters of the various objects, such as defining a material failure variable (MFV) among others, and setting and defining initial trajectories for the various objects, among others. Various methods of inputting the foregoing parameters may be used, such as, for example, importing the parameters from a separate software package, examples of which include NETGEN (See, J. Schöberl. NETGEN—An advancing front 2D/3D-mesh generator based on abstract rules. *Computing and Visualization in Science*, 1:41–52, 1997), and ALIAS/Wavefront, among others.

After the initial conditions have been defined, the animation system computes the dynamics of the material of the various objects, as depicted in block 112. Although the various process steps of block 112 will be described in greater detail hereinafter, briefly stated, the computations include resolving both internal and collision forces of the objects and integrating the system forward in time. After the material dynamics have been computed, the animation system computes a fracture origination variable (FOV) which preferably includes the determination of separation tensors (described in detail hereinafter).

After computation of the FOV, a determination is made in block 116 as to whether the FOV is greater than or equal to the MFV, which was defined in block 110. If it is determined that the FOV is greater than or equal to the MFV, the system proceeds to block 118 where a fracture is generated. If, however, the FOV is less than the MFV, a determination is made in block 120 as to whether it is time for a new frame. If, during the determination phase embodied in block 120, it is determined that it is time for a new frame, the system proceeds to block 122 where the current frame is rendered. If, however, it is not time for a new frame, the system proceeds back to block 112 where the material dynamics of the various objects are computed again.

After the step of fracture generation, which will be described in greater detail hereinafter, the animation system proceeds to block 124 where various cached values, such as node mass and element basis matrix variables are recomputed. The animation system then once again queries in block 120 whether it is time for a new frame and then based on this determination, proceeds to either block 112 or block 122, as previously described. Assuming that the animation system renders the frame (block 122), the system then proceeds to block 126 where a determination is made as to whether the process is complete. If the process is not complete, the animation system proceeds back to block 112 and the material dynamics are once again computed. If, however, the process is complete, the process may end at block 128.

Figure 9:
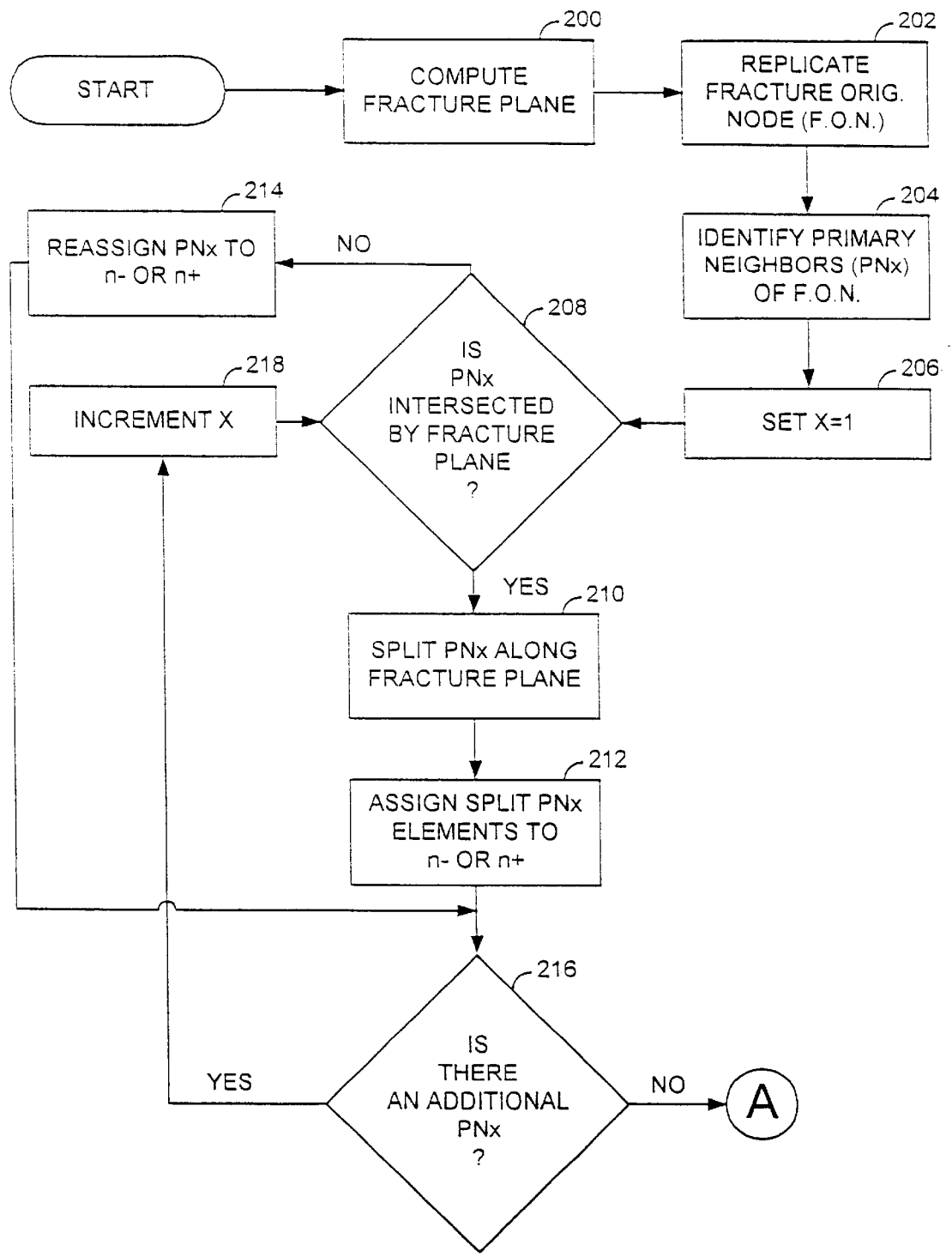
FIG. 9 is a flow diagram functionally demonstrating the steps performed by a preferred embodiment of the present invention during fracture generation of a primary neighbor (PN).
Figure 11:
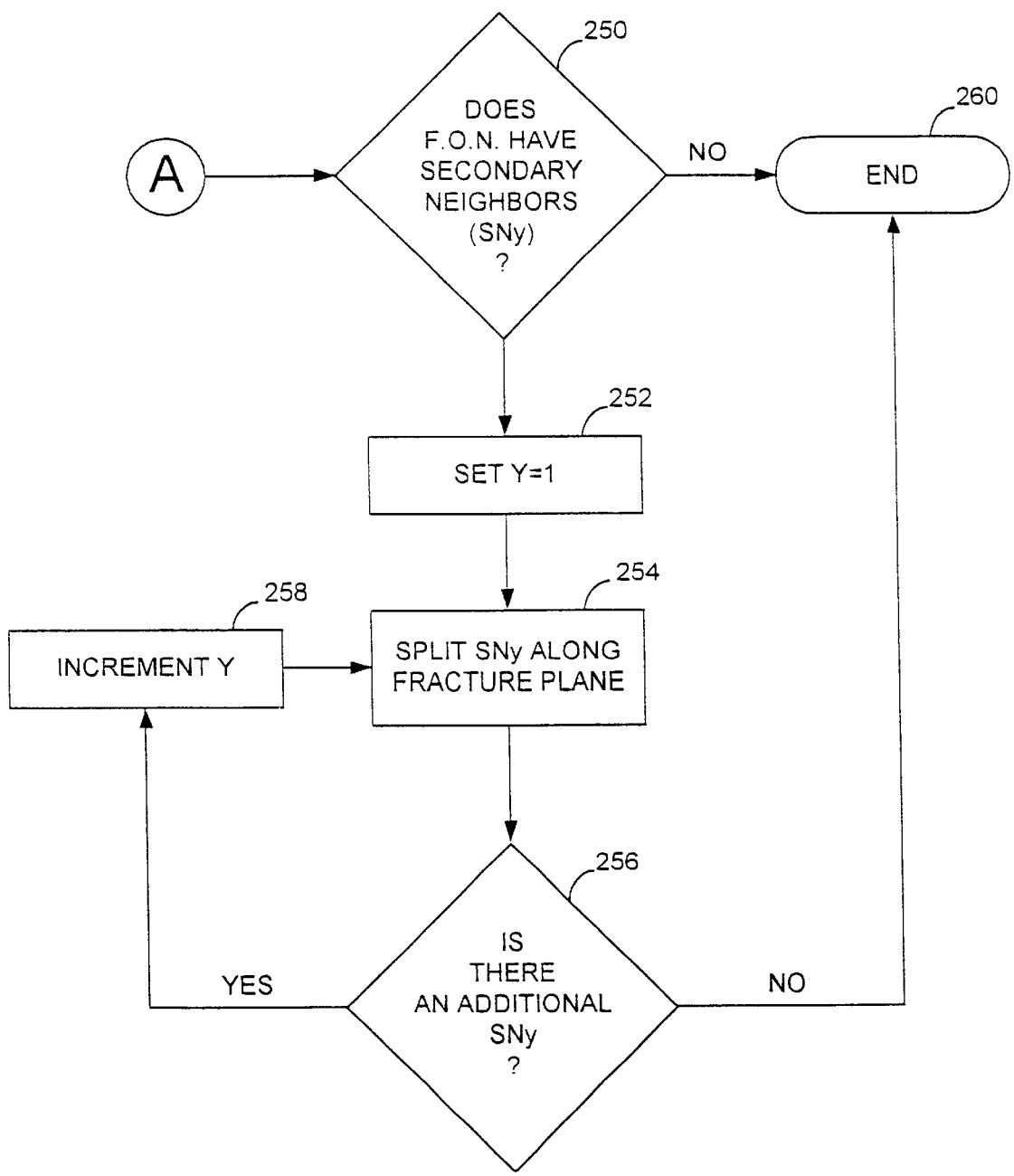
FIG. 11 is a flow diagram functionally demonstrating the steps performed by the present invention during fracture generation in a secondary neighbor (SN).

FIGS. 9 and 11 set forth in detail preferred steps in the fracture generation process depicted in block 118, and will be described in due course hereinafter. However, prior to embarking on a more detailed discussion of the preferred embodiment of the animation system of the present invention, a discussion of the underlying principles involved is deemed appropriate.

As a matter of introduction, fractures arise in materials due to internal stresses created as the material deforms. In order to model these fractures, the deformations that cause the fractures also must be modeled. To provide a suitable framework for modeling fractures, the deformation method utilized by the animation system of the present invention preferably provides information about the magnitude and orientation of the internal stresses, and whether they are tensile or compressive. Additionally, although numerous deformation methods exist, preferred embodiments of the animation system of the present invention avoid deformation methods in which directional artifacts appear in the stress patterns and propagate to the resulting fracture patterns.

A preferred deformation technique utilized by the animation system of the present invention defines a set of differential equations that describe the aggregate behavior of the material to be simulated in a continuous fashion, and then preferably utilizes a finite element method to discretize these equations for computer simulation. Although this approach is fairly standard, and many different deformation models can be derived in this fashion, the preferred embodiment presented herein was designed to be simple, fast, and suitable for fracture modeling.

The preferred embodiment of the deformation model described herein utilizes a continuous model which is based on continuum mechanics (an excellent introduction to this area can be found in the text by Fung. (See, Y. C. Fung. *A First Course in Continuum Mechanics.* Prentice-Hall, Englewood Cliffs, N.J., 1969). The primary assumption in the continuum approach is that the scale of the effects being modeled is significantly greater than the scale of the material's composition. Therefore, the behavior of the molecules, grains, or particles that compose the material can be modeled as a continuous media. Although this assumption is often valid for modeling deformations, macroscopic fractures can be significantly influenced by effects that occur at small scales where this assumption may not be valid. Because we are interested in graphical appearance rather than rigorous physical correctness, we will put this issue aside and assume that a continuum model is adequate.

Figure 4A:
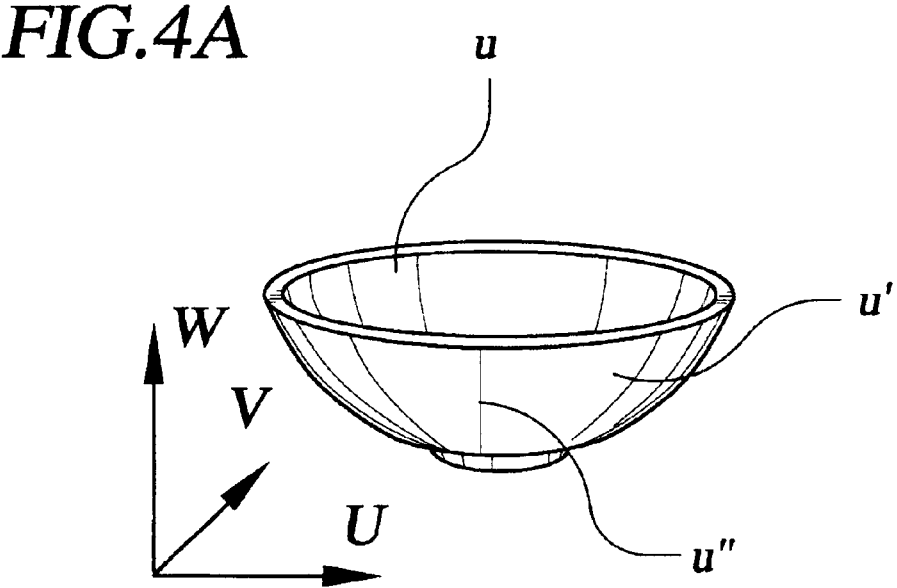
FIG. 4A depicts a 3D parameterization of a representative object in a material coordinate system.
Figure 4B:
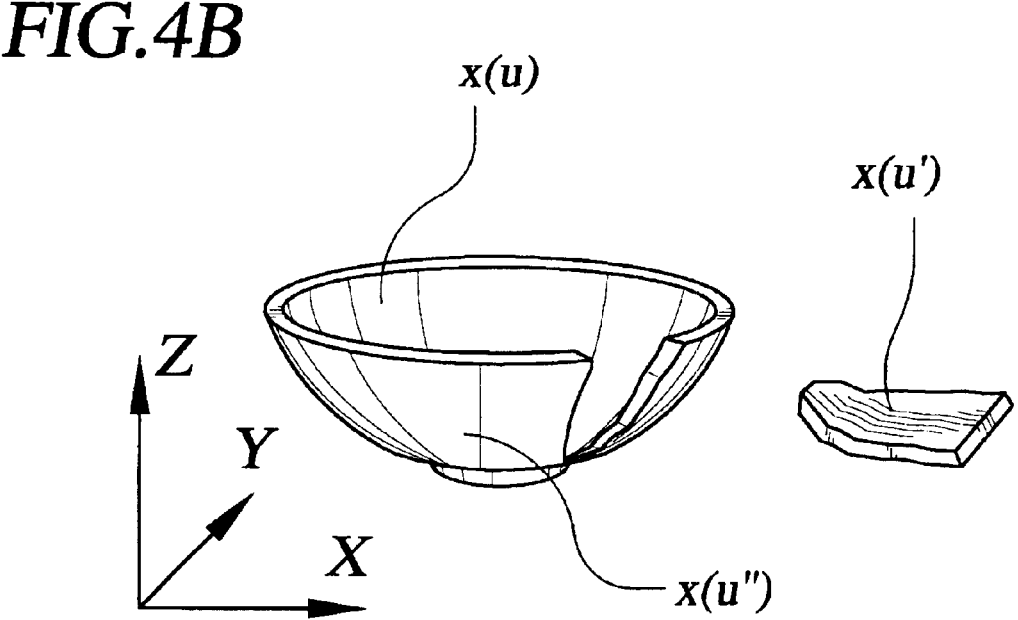
FIG. 4B depicts the object of FIG. 4A in a world coordinate system.

We begin the description of the continuous model by defining material coordinates that parameterize the volume of space occupied by the object(s) being modeled. As shown in FIG. 4A, the material coordinates define a 3D parameterization of the object. The function x(u) maps points from their location in the material coordinate frame to their location in the world coordinates (FIG. 4B). As shown in FIG. 4B, a fracture corresponds to a discontinuity in x(u). Let $u=[u, w]^T$ be a vector in $R^3$ that denotes a location in the material coordinate frame as shown in FIG. 4A. The deformation of the material is defined by the function $x(u)=[u, v, w]^T$ that maps locations in the material coordinate frame to locations in world coordinates. In areas where material exists, x(u) is continuous, except across a finite number of surfaces within the volume that correspond to fractures in the material. In areas where there is no material, x(u) is undefined.

Preferably, Green's strain tensor, $\epsilon$, is used to measure the local deformation of the material. (See, Y. C. Fung. *Foundations of Solid Mechanics.* Prentice-Hall, Englewood Cliffs, N.J., 1965). It can be represented as a 3×3 symmetric matrix defined by:

$$\varepsilon_{ij} = \left(\frac{\partial x}{\partial u_i} \cdot \frac{\partial x}{\partial u_j}\right) - \delta_{ij} \qquad (1)$$

where $\delta_{ij}$ is the Kronecker delta:

$$\delta_{ij} = \begin{cases} 1 & : i = j \\ 0 & : i \neq j \end{cases} \qquad (2)$$

This strain metric only measures deformation; it is invariant with respect to rigid body transformations applied to x and vanishes when the material is not deformed. Because it is a tensor, its invariants do not depend on the orientation of the material coordinate or world systems (the Euclidean metric tensor used by Terzopoulos and Fleischer differs only by the $\delta_{ij}$ term).

Preferably, the strain rate tensor, v, is used to measure the rate at which the strain is changing. It can be derived by taking the time derivative of equation (1) and is defined by:

$$v_{ij} = \left(\frac{\partial x}{\partial u_i} \cdot \frac{\partial \dot{x}}{\partial u_j}\right) + \left(\frac{\partial x}{\partial u_i} \cdot \frac{\partial \dot{x}}{\partial u_j}\right) \qquad (3)$$

where an over dot indicates a derivative with respect to time such that x is the material velocity expressed in world coordinates.

The strain and strain rate tensors provide the raw information that is required to compute internal elastic and damping forces, but they do not take into account the properties of the material. The stress tensor, $\sigma$, combines the basic information from the strain and strain rate with the material properties and determines forces internal to the material. Like the strain and strain rate tensors, the stress tensor can be represented as a 3×3 symmetric matrix which has two components: the elastic stress due to strain, $\sigma^{(e)}$, and the viscous stress due to strain rate, $\sigma^{(v)}$. The total internal stress, is the sum of these two components with $$\sigma = \sigma^{(e)} + \sigma^{(v)} \tag{4}$$

The elastic stress and viscous stress are respectively functions of the strain and strain rate. In their most general linear forms, they are defined as:

$$\sigma_{ij}^{(e)} = \sum_{k=1}^{3} \sum_{l=1}^{3} C_{ijkl} \varepsilon_{kl} \tag{5}$$

$$\sigma_{ij}^{(v)} = \sum_{k=1}^{3} \sum_{l=1}^{3} D_{ijkl} v_{kl} \tag{6}$$

where C is a set of the eighty-one (81) elastic coefficients that relate the elements of $\epsilon$ to the elements $\sigma^{(e)}$, and D is a set of the eighty-one (81) damping coefficients (actually, C and D are rank four tensors, and equations (5) and (6) are normally expressed in this form so that C and D will follow the standard rules for coordinate transforms).

Because both $\epsilon$ and $\sigma^{(e)}$ are symmetric, many of the coefficients in C are either redundant or constrained, and C can be reduced to thirty-six (36) independent values that relate the six (6) independent values of $\epsilon$ to the six independent values of $\sigma^{(e)}$. If we impose the additional constraint that the material is isotropic, then C collapses further to only two independent values, $\mu$ and $\lambda$, which are known as the Lame constants of the material. Equation (5) then reduces to:

$$\sigma_{ij}^{(e)} = \sum_{k=1}^{3} \lambda \varepsilon_{kk} \delta_{ij} + 2\mu \varepsilon_{ij} \tag{7}$$

The material's rigidity is determined by the value of $\mu$, and the resistance to changes in volume (dilation) is controlled by $\lambda$.

Similarly, D can be reduced to two independent values, $\phi$ and $\psi$, and equation (6) then reduces to:

$$\sigma_{ij}^{(v)} = \sum_{k=1}^{3} \phi v_{kk} \delta_{ij} + 2\psi v_{ij} \tag{8}$$

The parameters $\mu$ and $\lambda$ will control how quickly the material dissipates internal kinetic energy. Since $\sigma^{(v)}$ is derived from the rate at which $\epsilon$ is changing, $\sigma^{(v)}$ will not damp motions that are locally rigid, and has the desirable property of dissipating only internal vibrations.

Once we have the strain, strain rate, and stress tensors, we can compute the elastic potential density, $\eta$, and the damping potential density, $\kappa$, at any point in the material preferably using:

$$\eta = \frac{1}{2} \sum_{i=1}^{3} \sum_{j=1}^{3} \sigma_{ij}^{(e)} \varepsilon_{ij} \tag{9}$$

$$\kappa = \frac{1}{2} \sum_{i=1}^{3} \sum_{j=1}^{3} \sigma_{ij}^{(v)} v_{ij} \tag{10}$$

These quantities can be integrated over the volume of the material to obtain the total elastic and damping potentials.

The elastic potential is the internal elastic energy of the material. The damping potential is related to the kinetic energy of the material after subtracting any rigid body motion and normalizing for the material's density.

Figure 5:
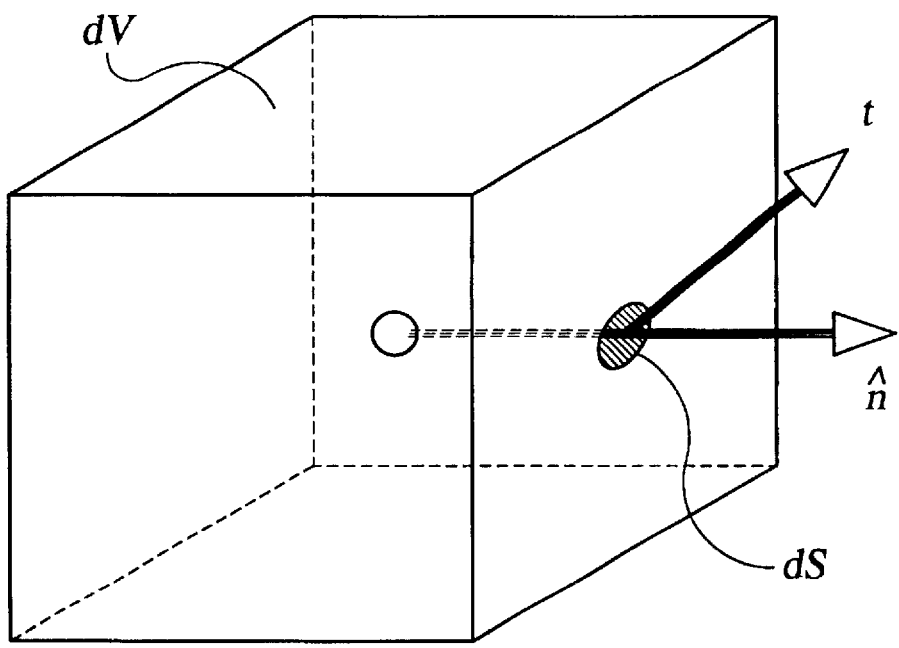
FIG. 5 depicts a representative volume of material showing detail of forces acting on the material.

The stress also can be used to compute the forces acting internal to the material at any location. Let n be an outward unit normal direction of a differential volume centered about a point in the material (FIG. 5). The traction, t, that acts on the surface element, dS, of a differential volume, dV, centered around the point with outward unit normal, $\hat{n}$, is given by:

$$t = \sigma \hat{n} \tag{11}$$

It should be noted that the technique for modeling and animating fracture described herein does not require the use of the strain or strain rate tensors directly; rather it preferably relies only on the stress. Additionally, although the computer graphics depicted herein were generated using this isotropic formulation, switching to an anisotropic formulation, or even to a nonlinear stress to strain relation, would not require significant changes and, therefore, are considered well within the scope of the invention.

Before a material's behavior can be modeled utilizing this continuous model approach, the material must be discretized in a way that is suitable for computer simulation. Two commonly used techniques are the finite difference and finite element methods.

A finite difference method divides the domain of the material into a regular lattice and then uses numerical differencing to approximate the spatial derivatives required to compute the strain and strain rate tensors. This approach is well suited for problems with a regular structure but becomes complicated when the structure is irregular.

Figure 6A:
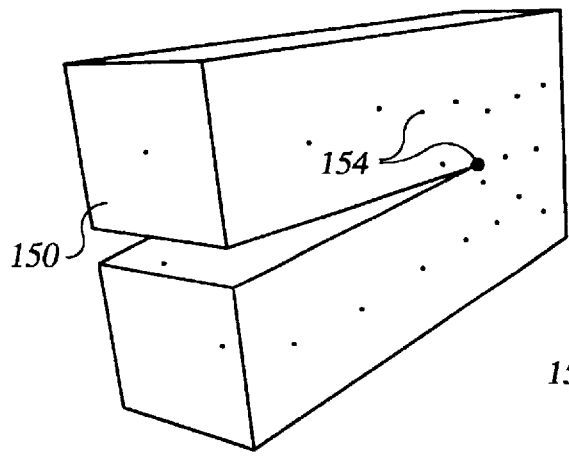
FIG. 6A depicts a representative object defined by a tetrahedral mesh with only the external faces of the tetrahedra being shown.
Figure 6B:
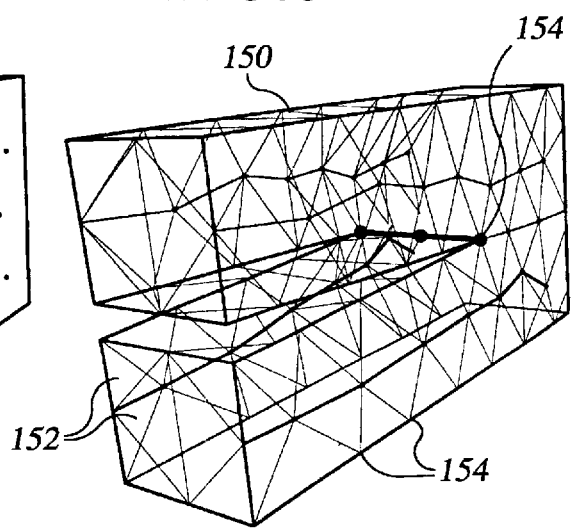
FIG. 6B depicts the object of FIG. 6A with the internal structure of the tetrahedral mesh being shown.

A finite element method, as depicted in FIGS. 6A and 6B, for example, partitions the domain of the material (e.g., object 150) into distinct sub-domains, or elements 152. Within each element, the material is described locally by a function with some finite number of parameters. The function is decomposed into a set of orthogonal shape, or basis, functions that are each associated with one of the nodes 154 on the boundary of the element. Adjacent elements will have nodes in common, so that the mesh defines a piecewise function over the entire material domain.

Preferably, the discretization method employed utilizes tetrahedral finite elements with linear polynomial shape functions, although finite elements of various other configurations may be utilized. By using a finite element method, the mesh can be locally aligned with the fracture surfaces, thus avoiding the previously mentioned artifacts. Just as triangles can be used to approximate any surface, tetrahedra can be used to approximate arbitrary volumes. Additionally, when tetrahedra are split along a fracture plane, the resulting pieces can be decomposed exactly into more tetrahedra.

Preferably, linear elements are chosen because higher-order elements are not cost effective for modeling fracture boundaries. Although higher-order polynomials provide individual elements with many degrees of freedom for deformation, they have few degrees of freedom for modeling fracture because the shape of a fracture is defined as a boundary in material coordinates. In contrast, with linear tetrahedra, each degree of freedom in the world space corresponds to a degree of freedom in the material coordinates. Furthermore, whenever an element is created, its basis functions typically are computed. For high-degree polynomials, this computation can be relatively expensive.

For systems where the mesh is constant, the cost of basis computation is amortized over the course of the simulation.

However, as fractures develop and parts of the object are re-meshed, the computation of basis matrices can become significant.

Figure 7A:
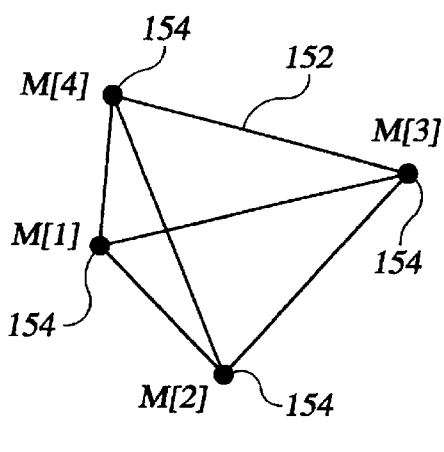
FIG. 7A depicts a representative tetrahedral element in the material coordinate system.
Figure 7B:
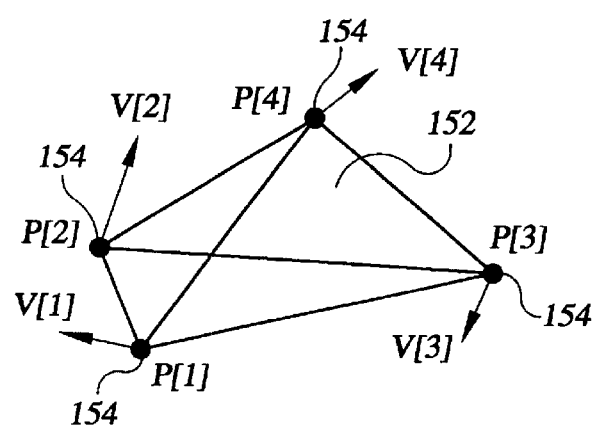
FIG. 7B depicts the tetrahedral element of FIG. 7A showing position and velocity in the world coordinate system.

As shown in FIGS. 7A and 7B, each tetrahedral element 152 is defined by four nodes 154. A node has a position in the material coordinates, m (FIG. 7A), a position in the world coordinates, p (FIG. 7B), and a velocity in world coordinates, v (FIG. 7B). We will refer to the nodes 154 of a given element 152 by indexing with square brackets. For example, $m_{[2]}$ is the position in material coordinates of the element's second node.

Barycentric coordinates provide a natural way to define the linear shape functions within an element. Let $b=[b_1, b_2, b_3, b_4]^T$ be barycentric coordinates defined in terms of the element's material coordinates so that $$\begin{bmatrix} u \\ 1 \end{bmatrix} = \begin{bmatrix} m_{[1]} & m_{[2]} & m_{[3]} & m_{[4]} \\ 1 & 1 & 1 & 1 \end{bmatrix} b \quad (12)$$

These barycentric coordinates may also be used to interpolate the node's world position and velocity with $$\begin{bmatrix} x \\ 1 \end{bmatrix} = \begin{bmatrix} p_{[1]} & p_{[2]} & p_{[3]} & p_{[4]} \\ 1 & 1 & 1 & 1 \end{bmatrix} b \quad (13)$$

$$\begin{bmatrix} x \\ 1 \end{bmatrix} = \begin{bmatrix} v_{[1]} & v_{[2]} & v_{[3]} & v_{[4]} \\ 1 & 1 & 1 & 1 \end{bmatrix} b \quad (14)$$

To determine the barycentric coordinates of a point within the element specified by its material coordinates, we invert equation (12) and obtain $$b = \beta \begin{bmatrix} u \\ 1 \end{bmatrix} \quad (15)$$

where β is defined by:

$$\beta = \begin{bmatrix} m_{[1]} & m_{[2]} & m_{[3]} & m_{[4]} \\ 1 & 1 & 1 & 1 \end{bmatrix}^{-1} \quad (16)$$

Combining equation (15) with equations (13) and (14) yields functions that interpolate the world position and velocity within the element in terms of the material coordinates:

$$x(u) = P\beta \begin{bmatrix} u \\ 1 \end{bmatrix} \quad (17)$$

$$\dot{x}(u) = V\beta \begin{bmatrix} u \\ 1 \end{bmatrix} \quad (18)$$

where P and V are defined as $$P = [P_{[1]} P_{[2]} P_{[3]} P_{[4]}] \quad (19)$$

$$V = [V_{[1]} V_{[2]} V_{[3]} V_{[4]}] \quad (20)$$

Note that the rows of β are the coefficients of the shape functions, and β preferably is computed only when an element is created or the material coordinates of its nodes change. For non-degenerate elements, the matrix in equation (16) typically is non-singular, however, elements that are nearly co-planar can cause β to be ill-conditioned and can adversely affect the numerical stability of the system.

Computing the values of ε and v within the element requires the first partials of x with respect to u:

$$\frac{\partial x}{\partial u_i} = P\beta \delta_i \quad (21)$$

$$\frac{\partial \dot{x}}{\partial u_i} = V\beta \delta_i \quad (22)$$

where $$\delta_i = [\delta_{i1} \delta_{i2} \delta_{i3} 0]^T \quad (23)$$

Because the element's shape functions are linear, these partials are constant within the element.

The element can exert elastic and damping forces on its nodes. The elastic force on the ith node, $$f_{[i]}^{(\varepsilon)},$$

is defined as the partial of the elastic potential density, η, with respect to $p_{[i]}$ integrated over the volume of the element. Given $\sigma^{(\varepsilon)}$, β, and the positions in world space of the four nodes, we can compute the elastic force by $$f_{[i]}^{(\varepsilon)} = \frac{vol}{2} \sum_{j=1}^{4} p_{[j]} \sum_{k=1}^{3} \sum_{l=1}^{3} \beta_{jl} \beta_{ik} \sigma_{kl}^{(\varepsilon)} \quad (24)$$

where $$vol = \frac{1}{6} [(m_{[2]} - m_{[1]}) \times (m_{[3]} - m_{[1]})] \cdot (m_{[4]} - m_{[1]}) \quad (25)$$

Similarly, the damping force on the ith node, $$f_{[i]}^{(v)},$$

is defined as the partial of the damping potential density, κ, with respect to $v_{[i]}$ integrated over the volume of the element. This quantity can be computed with $$f_{[i]}^{(V)} = \frac{vol}{2} \sum_{j=1}^{4} P_{[J]} \sum_{k=1}^{3} \sum_{l=1}^{3} \beta_{jl} \beta_{ik} \sigma_{kl}^{(v)} \quad (26)$$

Summing these two forces, the total internal force that an element exerts on a node is $$f_{[i]}^{el} = \frac{vol}{2} \sum_{j=1}^{4} P_{[J]} \sum_{k=1}^{3} \sum_{l=1}^{3} \beta_{jl} \beta_{ik} \sigma_{kl} \quad (27)$$

and the total internal force acting on the node preferably is obtained by summing the forces exerted by all elements that are attached to the node.

As the element is compressed to less than about 30% of its material volume, the gradients of η and κ start to vanish causing the resisting forces to fall off. We have not found this to be a problem, however, as most common materials tend to conserve their volume to within a few percent.

Using a lumped mass formulation, the mass contributed by an element to each one of its nodes is determined by integrating the material density, ρ, over the element shape function associated with that node. In the case of tetrahedral elements with linear shape functions, this mass contribution is simply ρ (vol)/4.

The derivations described hereinbefore are sufficient for a simulation that uses an explicit integration scheme. Additional work, such as computing the Jacobian of the internal forces, typically is necessary for an implicit integration scheme, although doing so is considered to be well within the skill of one ordinarily skilled in the art.

In addition to the forces internal to the material, the system typically computes collision forces, as mentioned hereinbefore in relation to block 112 of FIG. 3. Preferably, the collision forces are computed using a penalty method, such as a penalty method proportional to node penetration or to overlap volume, for example, that is applied when two elements intersect or if an element violates another constraint, such as a boundary, for instance. Penalty forces offer the advantage of being very fast to compute.

The node penetration criteria sets the penalty force to be proportional to the distance that a node has penetrated into another element. The penalty force acts in the direction normal to the penetrated surface. The reaction force is distributed over the penetrated element's nodes so that the net force and moment are the negation of the penalty force and moment acting at the penetrating node. Although this test typically does not catch all collisions, and undetected intersecting tetrahedra may become locked together, this test is, however, fast to compute, easy to implement, and adequate for most situations.

The overlap volume criteria is more robust than the node penetration method, but it is also slower to compute and more complex to implement. The intersection of two tetrahedral elements is computed by clipping the faces of each tetrahedron against the other. The resulting polyhedron is then used to compute the volume and center of mass of the intersecting region. The area weighted normals of the faces of the polyhedron that are contributed by one of the tetrahedra are summed to compute the direction in which the penalty force acts. A similar computation can be performed for the other tetrahedra, or equivalently, the direction can be negated. Provided that neither tetrahedra is completely contained within the other, this criteria is more robust than the node penetration criteria. Additionally, the forces computed with this method do not depend on the object tessellation.

Since computing the intersections within the mesh of a material can be very expensive, a bounding hierarchy scheme with cached traversals preferably is utilized to help reduce this cost.

Preferably, the animation system of the present invention utilizes a fracture model which is based on the theory of linear elastic fracture mechanics. (See, T. L. Anderson. *Fracture Mechanics: Fundamentals and Applications*. CRC Press, Boca Raton, second edition, 1995). The primary distinction between this and other theories of fracture is that the region of plasticity near the crack tip is neglected. However, the present invention can be modified to include the effect of this region of plasticity, as would be readily known to one of ordinary skill in the art.

The term "crack tip" implies that the fracture will have a single point at its tip; however, typically, the front of the crack will not be a single point, rather it will be a curve that defines the boundary of the surface discontinuity in material coordinates. Nevertheless, we will refer to this front as the crack tip. Because we are not modeling the energy dissipated by this plastic region, modeled materials typically will be "brittle." This statement does not mean that they are weak; rather the term "brittle" refers to the fact that once the material has begun to fail, the fractures will have a strong tendency to propagate across the material as they are driven by the internally stored elastic energy.

Figure 8A:
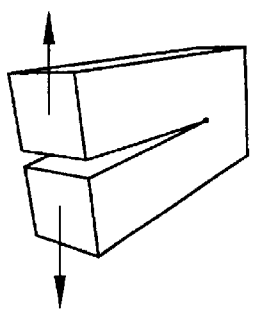
FIG. 8A depicts a representative object with a crack showing an opening loading mode.
Figure 8B:
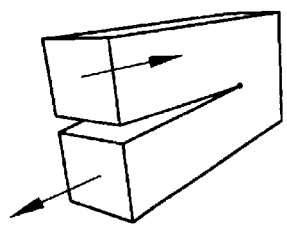
FIG. 8B depicts the object of FIG. 8A showing an in plane sheer loading mode.
Figure 8C:
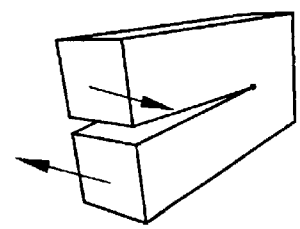

There are three loading modes by which forces can be applied to a crack causing it to open further. As shown in FIGS. 8A–8C, these modes are: (1) opening (FIG. 8A); in-plane shear (FIG. 8B), and; out-of-plane shear (FIG. 8C). In most circumstances, some combination of these modes will be active, producing a mixed-mode load at the crack tip. In all cases, the behavior of the crack can be resolved by analyzing the forces acting at the crack tip: tensile forces that are opposed by other tensile forces typically tend to cause the crack to continue in a direction that is perpendicular to the direction of largest tensile load, and conversely, compressive loads typically tend to arrest a crack to which they are perpendicular.

The finite element model describes the surface of a fracture with elements that are adjacent in material coordinates but that do not share nodes across the internal surface. The curve that represents the crack tip is then implicitly defined in a piecewise linear fashion by the nodes that border the fracture surface, and further extension of the crack may be determined by analyzing the internal forces acting on these nodes.

Element nodes preferably are utilized to determine where a crack should be initiated. While this strategy could potentially introduce unpleasant artifacts, we note that because the surface of an object preferably is defined by a polygonal boundary (the outer faces of tetrahedra, for example) there will always be a node located at any concavities. Because concavities are precisely the locations where cracks commonly begin, we believe that this decision is acceptable.

As previously described in relation to FIG. 3, a preferred embodiment of the animation system of the present invention incorporates a fracture algorithm as follows: preferably after every time step, the system resolves the internal forces acting on all nodes into their tensile and compressive components, discarding any unbalanced portions. At each node, the resulting forces are then used to form the separation tensor that describes how the internal forces are acting to separate that node. If the action of the separation tensor is sufficiently large, a fracture is generated, such as by splitting the node into two distinct nodes, and by computing a fracture plane, as described in detail hereinafter.

Preferably, the forces acting on a node are decomposed by first separating the element stress tensors into tensile and compressive components. For a given element in the mesh, let $v^i(\sigma)$, with $i \in \{1,2,3\}$, be the ith eigenvalue of $\sigma$, and let $\hat{n}^i$ be the corresponding unit length eigenvector. Positive eigenvalues correspond to tensile stresses and negative ones to compressive stresses. Since $\sigma$ is real and symmetric, it will have three real, not necessarily unique, eigenvalues. In the case where an eigenvalue has multiplicity greater than one, the eigenvectors are selected arbitrarily to orthogonally span the appropriate subspace. (See, W. H. Press, B. P. Flannery, S. A. Teukolsky, and W. T. Vetterling. *Numerical Recipes in C*. Cambridge University Press, second edition, 1994).

Given a vector $\alpha$ in $R^3$, we can construct a 3×3 symmetric matrix, $m(\alpha)$, that has $|\alpha|$ as an eigenvalue with a as the corresponding eigenvector, and with the other two eigenvalues equal to zero. This matrix is defined by $$m(a) = \begin{cases} aa^T/|a| & : a \neq 0 \\ 0 & : a = 0 \end{cases} \quad (28)$$

The tensile component, $\sigma^+$, and compressive component, $\sigma^-$, of the stress within the element can now be computed by $$\sigma^+ = \sum_{i=1}^{3} \max(0, v^i(\sigma))m(\hat{n}^i(\sigma)) \quad (29)$$

$$\sigma^- = \sum_{i=1}^{3} \min(0, v^i(\sigma))m(\hat{n}^i(\sigma)) \quad (30)$$

Using this decomposition, the force that an element exerts on a node can be separated into a tensile component, $f^+_{[i]}$, and a compressive component, $f^-_{[i]}$. This separation is done by re-evaluating the internal forces exerted on the nodes using equation (27) with $\sigma^+$ or $\sigma^-$ substituted for $\sigma$. Thus the tensile component is $$f^+_{[i]} = \frac{vol}{2} \sum_{j=1}^{4} P_{[j]} \sum_{k=1}^{3} \sum_{l=1}^{3} \beta_{jl}\beta_{ik}\sigma^+_{kl} \quad (31)$$

The compressive component can be computed similarly, but because $\sigma = \sigma^+ + \sigma^-$, it can be computed more efficiently using $f_{[i]} = f^+_{[i]} + f^-_{[i]}$.

Each node will now have a set of tensile and a set of compressive forces that are exerted by the elements attached to it. For a given node, we denote these sets as $\{f^+\}$ and $\{f^-\}$ respectively. The unbalanced tensile load, $f^+$ is simply the sum over $\{f^+\}$, and the unbalanced compressive load, $f^-$, is the sum over $\{f^-\}$.

We describe the forces acting at the nodes using a stress variant that we call the separation tensor, $\varsigma$. The separation tensor is formed from the balanced tensile and compressive forces acting at each node and is computed by $$\varsigma = \frac{1}{2}\left(-m(f^+) + \sum_{f \in \{f^+\}} m(f) + m(f^-) - \sum_{f \in \{f^-\}} m(f)\right) \quad (32)$$

It does not respond to unbalanced actions that would produce a rigid translation, and is invariant with respect to transformations of both the material and world coordinate systems.

Preferably, the separation tensor is used directly to determine whether a fracture should occur at a node. Let $v^+$ be the largest positive eigenvalue of $\varsigma$. If $v^+$ is greater than a material failure variable, such as the material toughness, $\tau$, among others, then the material will fail at the node. The orientation in world coordinates of the fracture plane is perpendicular to $\hat{n}^+$, the eigenvalue of $\varsigma$ that corresponds to $v^+$. In the case where multiple eigenvalues are greater than the material failure variable, multiple fracture planes may be generated by first generating the plane for the largest value, re-meshing the material, as described in detail hereinafter, and then recomputing the new value for $\varsigma$ and proceeding as previously described, although other methodologies may be employed.

Once the simulation has determined the location and orientation of a new fracture plane, the mesh of the material preferably is modified to reflect the new discontinuity. Typically, the orientation of the fracture should be preserved, as approximating it with the existing element boundaries may create undesirable artifacts. To avoid this potential difficulty, the algorithm utilized preferably re-meshes the local area surrounding the new fracture, such as by splitting elements that intersect the fracture plane and then modifying neighboring elements to ensure that the mesh stays self-consistent.

Referring now to FIG. 9, a preferred method for generating fracture will be described in detail. After the fracture plane has been computed, as previously described, the node or fracture origination node (FON) is replicated as depicted in block 202, so that there are now two nodes with the same material position, world position, and velocity. The discontinuity passes "between" these two co-located nodes. Primary neighbors (PN$_x$) of the FON then are identified, as depicted in block 204, with the PN$_x$ elements being defined as elements which are attached to the FON. The animation system then proceeds to block 206 where x is set to 1.

A determination then is made as to whether PN$_x$ is intersected by the fracture plane as depicted in block 208, such as by comparing the world location of the nodes to the fracture plane. If it is determined that PN$_x$ is intersected by the fracture plan, PN$_x$ is split along the fracture plane as depicted in block 210 with each of the split PN$_x$ elements being assigned to either side of the fracture plane (n$^-$ or n$^+$), as depicted in block 212. Because all elements preferably are tetrahedra, in general each intersected element will be split into three tetrahedra, with one of the tetrahedra being assigned to one side of the plane and the other two tetrahedra to the other side. Because the two tetrahedra that are on the same side of the plane both share one of the replicated nodes, the discontinuity does not pass between them.

If, however, it is determined that PN$_x$ is not intersected by the fracture plane in block 208, the animation system proceeds to block 214 where PN$_x$ is assigned to one or the other sides of the fracture plane. Assuming, however, that PN$_x$ has been split, a determination is made as to whether any additional PN$_x$ elements exist, i.e., PN$_{x+1}$, such as depicted in block 216. If so, the animation system proceeds to block 218 where the variable x is incremented. The animation system then proceeds once again to block 208 where a determination is once again made as to whether PN$_{x+1}$ is intersected by the fracture plane. These process steps then preferably proceed in sequence as described hereinbefore until a determination is made, such as in block 216, that there are no additional PN$_x$ elements. When such a determination has been made, the animation system preferably evaluates secondary neighbors (SN$_y$) as described in detail hereinafter in relation to a preferred subroutine depicted in FIG. 11.

Figure 10A:
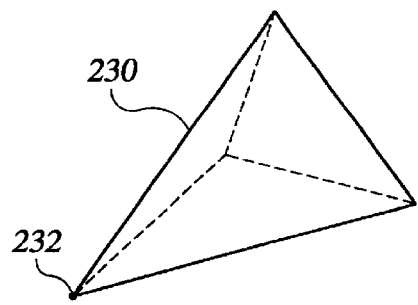
FIG. 10A is a perspective view of a representative tetrahedral element.
Figure 10B:
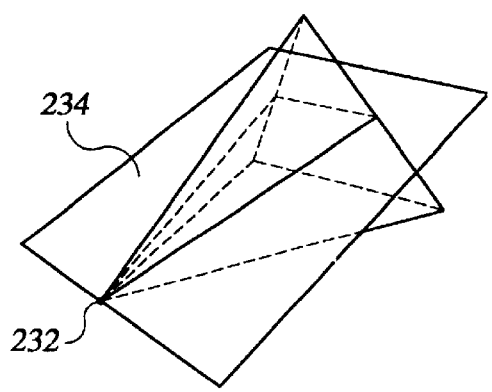
FIG. 10B is a perspective view of the element of FIG. 10A shown intersected by a fracture plane.
Figure 10C:
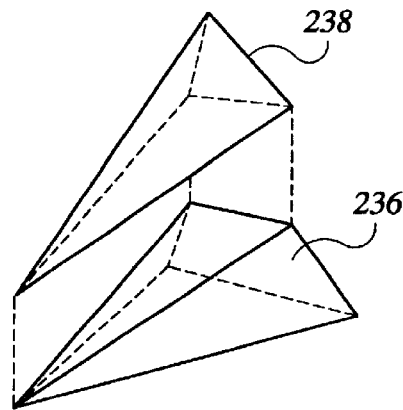
FIG. 10C is a partially-exploded, perspective view of the element of FIGS. 10A and 10B showing detail of the element being split along the fracture plane.

Referring now to FIGS. 10A through 10D, a graphic depiction of the process steps embodied in the flow chart of FIG. 9 is presented. As shown in FIG. 10A, a representative tetrahedral element 230 is shown which incorporates a node 232. For purposes of this discussion, node 232 is a fracture origination node or FON (e.g., it has previously been determined that a fracture is to originate at node 232). As shown in FIG. 10B, a fracture plane 234 is computed with the orientation of the fracture plane 234 being such that it intersects element 230. Additionally, it should be noted that element 230 is considered a primary neighbor or PN$_1$ of the node 232. As depicted in FIG. 10C, fracture plane 234 intersects element 230 so as to divide the element into two polyhedrons, 236 and 238, with only the polyhedron 238 being configured as a tetrahedron.

Figure 10D:
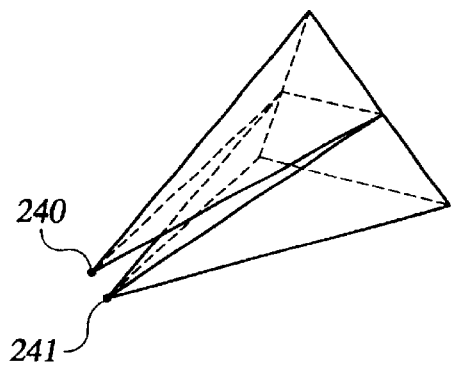
FIG. 10D is a perspective view of the element of FIGS. 10A through 10C graphically illustrating a preferred method for generating a fracture at a fracture origination node.
Figure 10E:
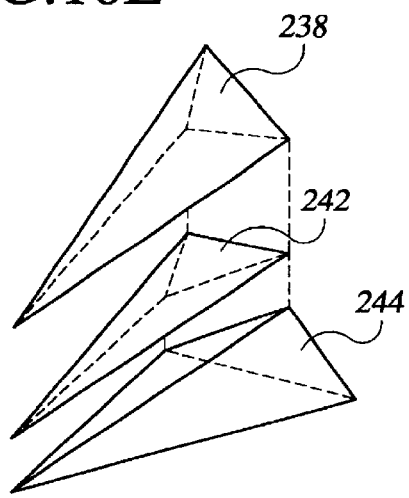
FIG. 10E is a partially-exploded, perspective view of the element of FIGS. 10A–10D graphically illustrating a preferred method for re-meshing an element.

As shown in FIG. 10D, as well as depicted in block 202 of FIG. 9, node 232 is replicated into nodes 240 and 241, so as to allow the node 232 to split apart and form a fracture. In addition to the elements that are attached to an FON, i.e., elements 236 and 238, it may be necessary to split other elements so that the mesh stays consistent. In particular, an element preferably is split if the face or edge between it and another element that was attached to the FON has been split. Thus, the polyhedra 236 and 238 are remeshed to form tetrahedra, i.e., tetrahedra 238, 242, and 244, so that mesh continuity may be maintained. To prevent the re-meshing from cascading across the entire mesh, these splits are done so that the new tetrahedra use only the FON's and the nodes created by the intersection splits. Because no new nodes are created when utilizing this preferred methodology, the effect of the local re-meshing is limited to the elements that are attached to the FON and its immediate neighbors ($PN_x$ and $SN_y$).

Referring now to FIG. 11, a preferred method for performing localized re-meshing is presented. Once the animation system determines that there are no additional $PN_x$ elements, such as in block 216 of FIG. 9, the animation system preferably proceeds to block 250 where a determination is made as to whether the FON has any $SN_y$ elements, e.g. elements which share an edge with a $PN_x$ element. If it is determined that at least one $PN_x$ element exists, the animation system proceeds to block 252 where Y is set to 1. At block 254, $SN_y$ is then split along the fracture plane and then the animation system proceeds to block 256 where a determination is made as to whether there are any additional $SN_y$ elements. If it is determined that additional $SN_y$ elements exist, the animation system proceeds to block 258 where Y is incremented. After Y is incremented, the animation system reenters block 254 so that any additional $SN_y$ elements may be split. If, however, no additional $SN_y$ elements exist, the animation system proceeds to block 260 where the remeshing algorithm ends.

Figure 12A:
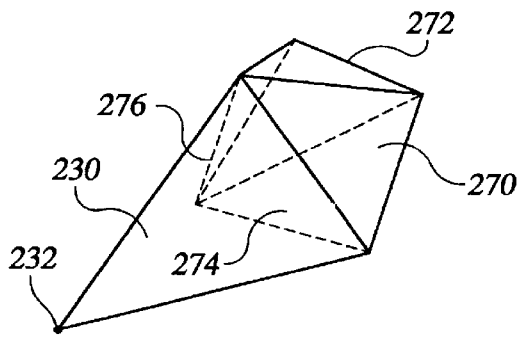
FIG. 12A is a perspective view of the tetrahedral element depicted in FIGS. 10A–10E shown with representative SN elements.
Figure 12C:
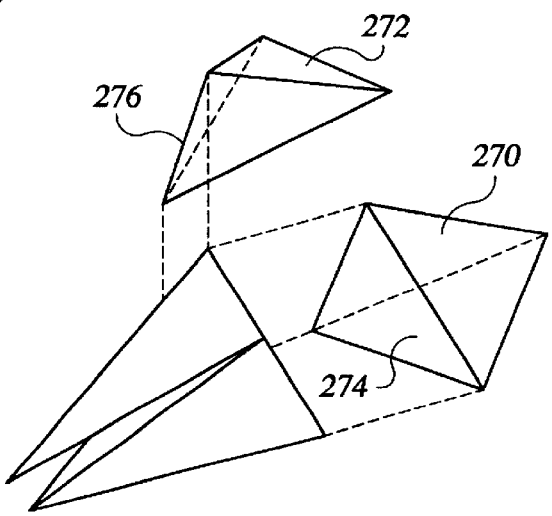
FIG. 12C is a partially-exploded, perspective view of the element of FIGS. 12A and 12B showing detail of the SN elements.
Figure 12B:
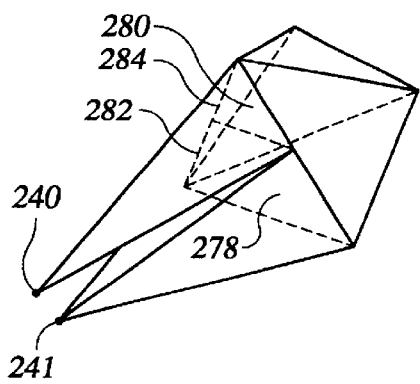
FIG. 12B is a perspective view of the element of FIG. 12A shown after the fracture origination node has been split.
Figure 12D:
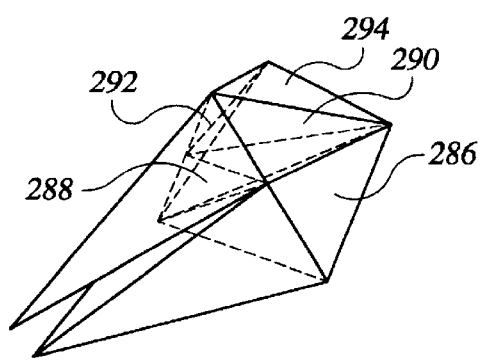
FIG. 12D is a perspective view of the element of FIGS. 12A through 12C graphically illustrating a preferred method for re-meshing the SN elements.

As shown in FIGS. 12A through 12D graphical representations depicting the re-meshing algorithm in relation to $SN_y$ elements are presented. In particular, in FIG. 12A element 230 is depicted with $SN_y$ elements 270 and 272, with element 270 sharing a face 274 with the element 230 and element 272 sharing an edge 276 with the element 230. As shown in FIG. 12B, as the node 232 is replicated and then split to form replicated nodes 240 and 241, it can be seen that the remeshing of element 230 results in the face 274 being split into subcomponent faces 278 and 280, and the edge 276 being split into subcomponent edges 282 and 284.

Figure 12E:
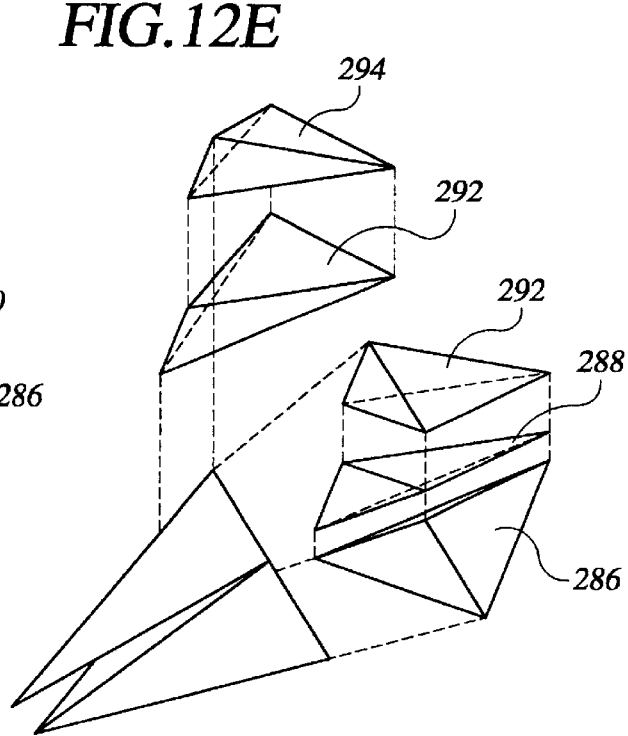
FIG. 12E is a partially-exploded, perspective view of the element of FIGS. 12A–12D graphically illustrating the re-meshed SN elements.

As shown in FIG. 12C, local re-meshing is provided to retain the integrity of the mesh network. In particular, as shown in detail in FIGS. 12D and 12E, element 270 is re-meshed into three tetrahedral elements, 286, 288 and 290, and element 272 is re-meshed into two tetrahedral elements 292 and 294. Finally, after the local re-meshing has been completed, any cached values that have become invalid should be recomputed. In the preferred implementation discussed herein, these values include the element basis matrix, $\beta$, and the node masses.

Two additional subtleties also should be considered. The first subtlety occurs when an intersection split involves an edge that is formed only by tetrahedra attached to the FON. When this happens, the fracture has reached a boundary in the material, and the discontinuity should pass through the edge. Preferably, re-meshing occurs as above, except that two nodes are created on the edge and one is assigned to each side of the discontinuity.

Second, the fracture plane may pass arbitrarily close to an existing node producing arbitrarily ill-conditioned tetrahedra. To avoid this, several thresholds may be employed, such as the distance between the fracture plane and an existing node, and the angle between the fracture plane and a line from the FON to the existing node, among others. For instance, if either of these thresholds are not met, then the intersection split can be snapped to the existing node. To achieve the results depicted herein, we have used thresholds of 5 mm and 0.1 radians, although numerous other suitable thresholds may be utilized depending on the particular application and the visual characteristics desired. Thus, in accordance with this preferred methodology, all elements attached to the node are divided along the fracture plane with the resulting tetrahedra assigned to one or the other incarnations of the split node, thereby creating a discontinuity in the material. Any cached values, such as the node mass or the element shape functions, are recomputed for the affected elements and nodes. With this technique, the location of a fracture or crack tip need not be explicitly recorded unless this information is useful for some other purpose, such as rendering images.

To demonstrate some of the effects that can be generated with the fracture technique implemented in the preferred embodiment of the present invention, we have animated a number of scenes that involve objects breaking. As shown in FIG. 1, an image from a simulation of a plate of glass that has had a heavy weight dropped on it is presented. The area in the immediate vicinity of the impact has been crushed into many small fragments. Farther away from the weight, a pattern of radial cracks has developed.

Figures 13A, 13B, 13C, 13D, 13E, 14A, 14B, 14C, 14D, 14E:
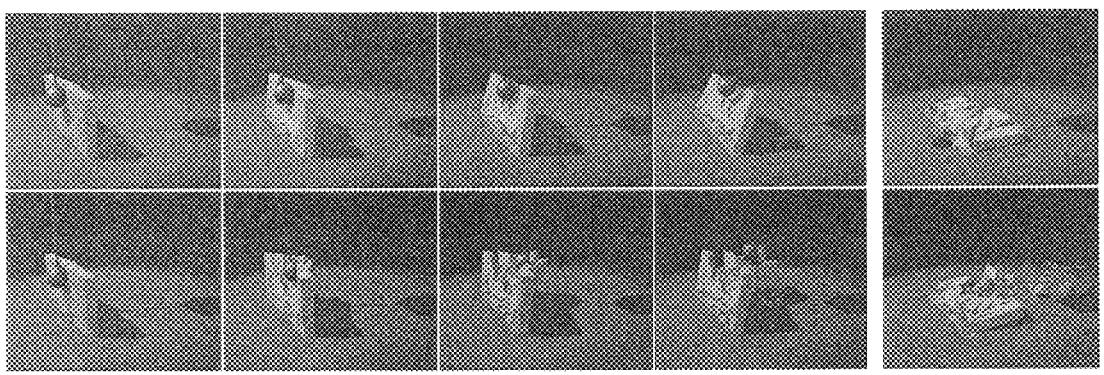
FIGS. 13A–13E are a series of captured computer rendered images, produced in accordance with a preferred embodiment of the present invention, representing a wall being struck by a wrecking ball.
FIGS. 14A–14E are a series of captured computer rendered images, produced in accordance with a preferred embodiment of the present invention, representing a wall being struck by a wrecking ball.
Figure 15A:
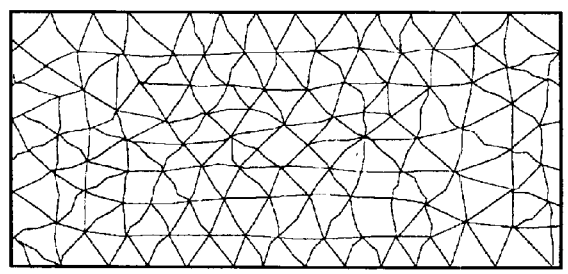
FIG. 15A depicts a representative mesh for a wall structure.
Figure 15B:
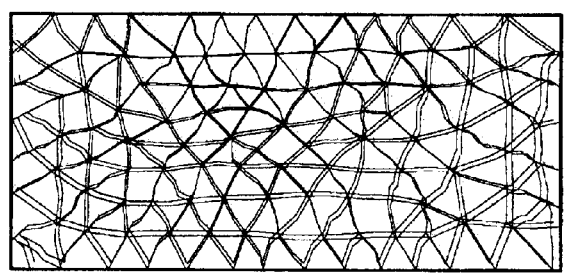
FIG. 15B depicts the wall of FIG. 15A after being struck by a simulated wrecking ball.
Figure 15C:
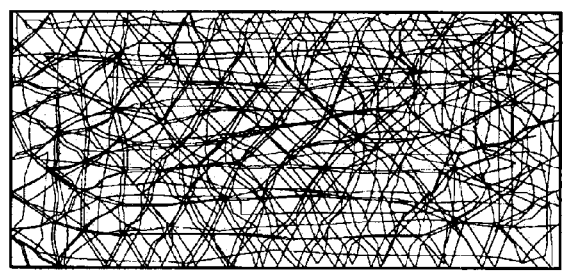
FIG. 15C depicts the wall of FIGS. 15A and 15B, with the cracks being emphasized.
Figure 15D:
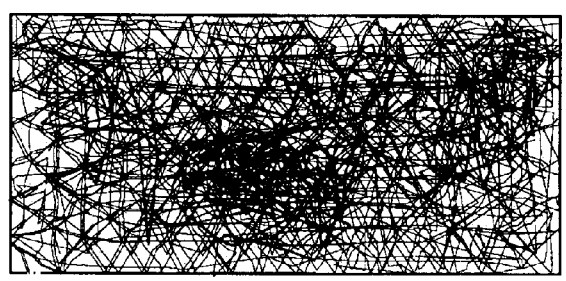
FIG. 15D depicts the wall of FIG. 15A–15C, showing internal fractures of the wall as wire frame.
Figures 16A, 16B, 16C, 16D:
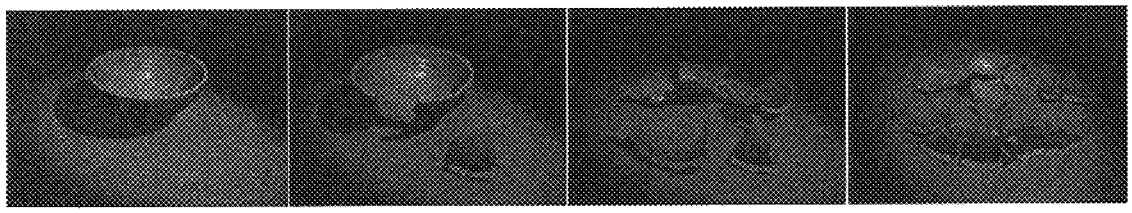
FIGS. 16A–16D depict representative objects which were dropped from a height during simulation, with each object having a successively lower material toughness.

As shown in FIGS. 13A–13E and 14A–14E, two other simulations generated by the animation system of the present invention are presented. The simulations comprise adobe walls that are struck by wrecking balls. In the simulations, both walls are attached to the ground, with the ball in FIGS. 14A–14E having 50 times the mass of the ball of FIGS. 13A–13E. The images of FIGS. 13A–13E are spaced 133.3 ms apart and the images of FIGS. 14A–14E are spaced 66.6 ms apart, with FIGS. 13E and 14E representing the final configurations of the respective simulations. As shown in the first sequence, the wall develops a network of cracks as it absorbs most of the ball's energy during the initial impact. In the second sequence, the wall shatters when it is struck.

The mesh used to generate the aforementioned wall sequences is shown in FIGS. 15A–15D. The initial mesh contains only 338 nodes and 1109 elements. By the end of the sequence, the mesh has grown to 6892 nodes and 8275 elements. These additional nodes and elements are created where fractures occur. It should be noted that a uniform mesh typically may require many times this number of nodes and elements to achieve a similar result.

Additionally, FIGS. 16A–16D depict the final frames from four animations of simulated bowls that were dropped onto a hard surface. Other than varying the material toughness, $\tau$, between the objects, the four simulations are identical. As shown in the figures, the first (toughest) bowl develops only a few cracks, while the last (weakest) bowl (FIG. 16D) breaks into many pieces.

Because the animation system of the present invention works with solid tetrahedral volumes rather than with the polygonal boundary representations created by many modeling packages, boundary models typically are converted before they can are used. A number of systems are available for creating tetrahedral meshes from polygonal boundaries. The models that we used in these examples were generated either from a CSG description or a polygonal boundary representation using NETGEN, a publicly available mesh generation package, although various other systems may be utilized.

The simulation parameters used to generate the examples disclosed herein are listed in Tables 1 and 2, hereinafter, along with the computation time required to generate one second of animation.

TABLE 1

Material Parameters for the Examples.

| FIG. | $\lambda(N/m^2)$ | $\mu(N/m^2)$ | $\phi(N/m^2)$ | $\psi(N/m^2)$ | $\rho(N/m^2)$ | $\tau(N/m^2)$ |
|---|---|---|---|---|---|---|
| 1 | $1.04 \times 10^8$ | $1.04 \times 10^8$ | 0 | 6760 | 2588 | 10140 |
| 13A-E | $6.03 \times 10^8$ | $1.21 \times 10^8$ | 3015 | 6030 | 2309 | 6030 |
| 14A-E | 0 | $1.81 \times 10^8$ | 0 | 18090 | 2309 | 6030 |
| 16A | $2.65 \times 10^8$ | $3.97 \times 10^6$ | 264 | 397 | 1013 | 52.9 |
| 16B | $2.65 \times 10^8$ | $3.97 \times 10^6$ | 264 | 397 | 1013 | 39.6 |
| 16C | $2.65 \times 10^8$ | $3.97 \times 10^6$ | 264 | 397 | 1013 | 33.1 |
| 16D | $2.65 \times 10^8$ | $3.97 \times 10^6$ | 264 | 397 | 1013 | 13.2 |
| 18A-F | 0 | $5.29 \times 10^7$ | 0 | 198 | 1013 | 106 |
| 19 | 0 | $9.21 \times 10^6$ | 0 | 9.2 | 705 | 73.6 |

TABLE 2

Simulation Times for the Examples.

| | Minutes of Computation Time per Simulation Second | | |
|---|---|---|---|
| Figure | Minimum | Maximum | Average |
| 1 | 75 | 667 | 273 |
| 13A-E | 75 | 562 | 399 |
| 14A-E | 75 | 2317 | 1098 |
| 16A | 90 | 120 | 109 |
| 16B | 82 | 135 | 115 |
| 16C | 90 | 150 | 127 |
| 16D | 82 | 187 | 156 |
| 18A-F | 247 | 390 | 347 |
| 19 | 622 | 6667 | 4665 |

The times listed in Table 2 reflect the total number of minutes required to compute one second of simulated data, including graphics and file I/O. Times were measured on an SGI O2 with a 195 MHz MIPS R10K processor.

While the material density values, $\rho$, are appropriate for glass, stone, or ceramic, we used values for the Lame constants, $\lambda$ and $\mu$, that are significantly less than those of real materials. Larger values would make the simulated materials appear stiffer, but would also require smaller time steps. The values that we have selected represent a compromise between realistic behavior and reasonable computation time.

Our current implementation can switch between either a forward Euler integration scheme or a second order Taylor integrator. Both of these techniques are explicit integration schemes, and subject to stability limits that typically require very small time steps for stiff materials. Although semi-implicit integration methods have error bounds similar to those of explicit methods, the semi-implicit integrators tend to drive errors towards zero rather than infinity so that they are stable at much larger time steps. Other researchers have shown that by taking advantage of this property, a semi-implicit integrator can be used to realize speed ups of two or three orders of magnitude when modeling object deformation. Using another integration method, including an implicit or semi-implicit method, is, however, considered well within the scope of the present invention.

One way to assess the realism of an animation technique is by comparing it with the real world. A comparison of images produced by the animation system of the present invention to a real-world event is depicted in FIGS. 17A–17F and FIGS. 18A–18F, where high-speed video footage of a physical bowl as it falls onto its edge is compared to our simulation. FIGS. 17A–17F show high-speed video images of a physical ceramic bowl dropped from approximately one meter onto a hard surface, while FIGS. 18A–18F are the output from a simulation where we attempted to match the initial conditions of the physical bowl. Although the two sets of fracture patterns are clearly different, the simulated bowl has some qualitative similarities to the real one. Both initially fail along the leading edge where they strike the ground, and subsequently develop vertical cracks before breaking into several large pieces (video images are 8 ms apart, while the simulation images are 13 ms apart).

Figure 19:
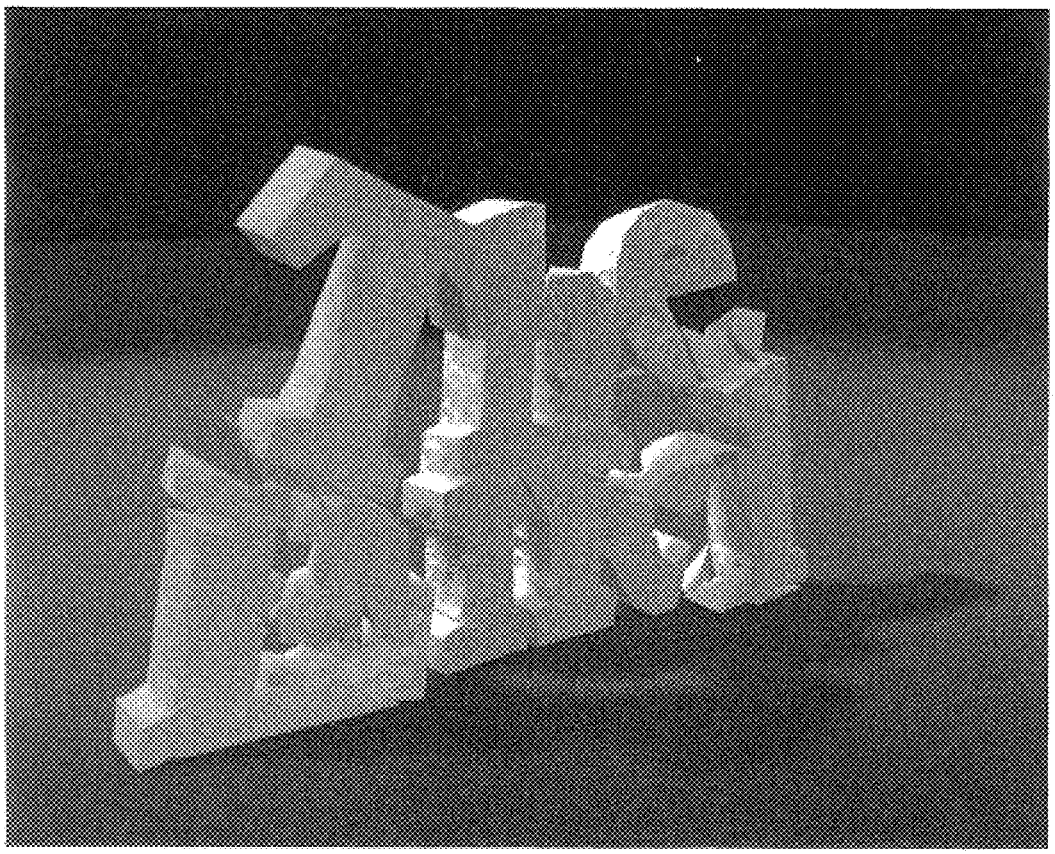
FIG. 19 is a simulation image of several representative objects that were dropped from a height.

Additionally, FIG. 19 is a simulation image of several representative objects that were dropped from a height.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention.

What is claimed is:

1. A method of animating object fracture comprising:
   setting initial conditions for an object, said initial conditions including a first parameter defining a fracture condition, said object being defined by at least one node;
   determining a second parameter corresponding to forces at said node;
   generating a fracture within said object when said second parameter at least equals said first parameter, said fracture originating at said node.

2. The method of claim 1, wherein said forces comprise at least one of the group consisting of internal material forces and external collision forces.

3. The method of claim 1, wherein the step of generating a fracture within said object comprises:
   replicating said node into a first node and a second node;
   computing a plane of fracture corresponding to said node, said plane defining first and second sectors;
   assigning a first portion of said object to said first sector, said first portion including said first node, and assigning a second portion of said object to said second sector, said second portion including said second node.

4. The method of claim 1, wherein said first parameter is a material failure variable.

5. The method of claim 1, wherein the step of determining a second parameter comprises computing a separation tensor of said node, said separation tensor being defined by the equation:

$$\varsigma = \frac{1}{2}\left(-m(f^+) + \sum_{f \in \{f^+\}} m(f) + m(f^-) - \sum_{f \in \{f^-\}} m(f)\right).$$

6. The method of claim 1, wherein said object is defined by a mesh and wherein the step of generating a fracture within said object comprises:
   computing a fracture plane, and;
   re-meshing an area surrounding said fracture plane such that said mesh stays self-consistent.

7. The method of claim 1, wherein said object is defined by a plurality of polyhedrons, each of said polyhedrons having a plurality of said nodes.

8. The method of claim 1, wherein the step of setting initial conditions comprises modeling said object.

9. The method of claim 1, wherein the step of generating a fracture within said object comprises rendering an image of said object for graphical display.

10. The method of claim 4, wherein said material failure variable is a material toughness of said object.

11. The method of claim 6, wherein the step of re-meshing an area surrounding said fracture plane comprises the steps of:

identifying primary neighbors of said node;

splitting each of said primary neighbors which are intersected by said fracture plane into split primary neighbor elements, said fracture plane defining first and second sectors, and;

assigning each of said split primary neighbor elements to one of said first and second sectors.

12. The method of claim 7, wherein each of said polyhedrons are tetrahedrons.

13. A method of animating object fracture, the object being defined by at least one element having a boundary, said method comprising:

determining that fracture of an object should be initiated, and;

generating a fracture within the object, said fracture being capable of propagating through the object independent of the boundary of the element.

14. The method of claim 13, wherein the object is defined by a mesh and wherein the step of generating a fracture within the object comprises:

determining a location of fracture origination, and;

determining a direction of fracture propagation by dynamically retesselating the mesh of the object.

15. The method of claim 14, wherein the step of generating a fracture within the object comprises reconfiguring the boundary of the element in response to the location of fracture origination and the direction of fracture propagation.

16. A computer readable medium having a computer program for animating object fracture, wherein initial conditions concerning the object have been specified, the initial conditions including a first parameter defining a fracture condition, and wherein the object is defined by at least one node, said computer readable medium comprising:

a first code segment which determines a second parameter corresponding to forces at the node, and;

a second code segment which generates a fracture within the object when the second parameter at least equals the first parameter, the fracture originating at the node.

17. An animation system for animating object fracture, wherein initial conditions concerning the object have been specified, the initial conditions including at least a first parameter defining a fracture condition, and wherein the object is defined by at least one node, said animation system comprising:

means for determining a second parameter corresponding to forces at the node, and;

means for generating a fracture within the object when the second parameter at least equals the first parameter, the fracture originating at the node.

18. The animation system of claim 17, wherein said system has means for modeling the object such that the object is defined by at least one node and means for rendering the object.

* * * * *

UNITED STATES PATENT AND TRADEMARK OFFICE
CERTIFICATE OF CORRECTION

PATENT NO.    : 6,456,289 B1
DATED         : September 24, 2002
INVENTOR(S)   : O'Brien et al.

It is certified that error appears in the above-identified patent and that said Letters Patent is hereby corrected as shown below:

Title page,
Item [54], Title, delete the phrase "ANIMATION SYSTEM AND METHOD FOR A ANIMATING OBJECT FRACTURE" and substitute therefor -- ANIMATION SYSTEM AND METHOD FOR ANIMATING OBJECT FRACTURE --.

Column 4,
Line 19, after the word "FIG." delete the word "8A", and substitute therefor -- 8C --.

Column 8,
Line 18, after the word "Let" delete the phrase "$u=[u, w]^T$", and substitute therefor -- $u = [u, v, w]^T$ --.

Column 14,
Line 57, after the word "vector", delete the phrase "$\alpha$", and substitute therefor -- $a$ --.
Line 58, after the word "matrix", delete the phrase "m($\alpha$)", and substitute therefor -- $m(a)$ --.
Line 58, after the word "has", delete the phrase "$|\alpha|$", and substitute therefor -- $|a|$ --.

Signed and Sealed this

Eighteenth Day of February, 2003

JAMES E. ROGAN
*Director of the United States Patent and Trademark Office*